United States Patent [19]

El-Saie

[11] Patent Number: 4,498,819

[45] Date of Patent: Feb. 12, 1985

[54] MULTIPOINT SLURRY INJECTION JUNCTION

[75] Inventor: Ahmed A. El-Saie, Ponca City, Okla.

[73] Assignee: Conoco Inc., Ponca City, Okla.

[21] Appl. No.: 439,671

[22] Filed: Nov. 8, 1982

[51] Int. Cl.[3] .............................................. B65G 53/52

[52] U.S. Cl. .................................... 406/181; 137/896; 366/165; 366/341; 406/19

[58] Field of Search .................................... 406/93–95, 406/19, 181; 137/896; 239/403, 405; 366/165, 341; 55/459 A

[56] References Cited

U.S. PATENT DOCUMENTS

| | | | |
|---|---|---|---|
| 143,254 | 8/1873 | Richards . | |
| 445,390 | 1/1891 | Cosgrove . | |
| 2,252,581 | 5/1939 | Saint-Jacques . | |
| 2,267,412 | 12/1941 | Merwin | 366/165 X |
| 2,890,929 | 6/1959 | Rummert | 55/459 A |
| 3,306,671 | 4/1965 | Leeman . | |
| 3,400,984 | 9/1968 | Shellene et al. | 406/93 X |
| 3,794,299 | 2/1974 | Wagner et al. | 366/165 X |
| 3,994,480 | 11/1976 | Fothergill et al. | 366/165 |
| 4,415,296 | 11/1983 | Funk | 406/19 |

*Primary Examiner*—Jeffrey V. Nase

*Attorney, Agent, or Firm*—William J. Miller

[57] ABSTRACT

An apparatus combines streams from different pipelines having different flow rates, concentrations, and pressure. The junction comprises a directed vortex formed by a conically-shaped enclosure having a closed base with one pipeline inlet through the base at the axis of the cone. Another higher pressure inlet is positioned on the periphery of the cone near the base and at a tangent to the covered cross-section at the point of entry. The high pressure inlet is also at an angle to the cross-section and directed toward the outlet at the apex of the cone. A fluid dewatering apparatus may be attached to the outlet to maintain a predetermined concentration in the case where one or more inlets contain a slurry.

3 Claims, 1 Drawing Figure

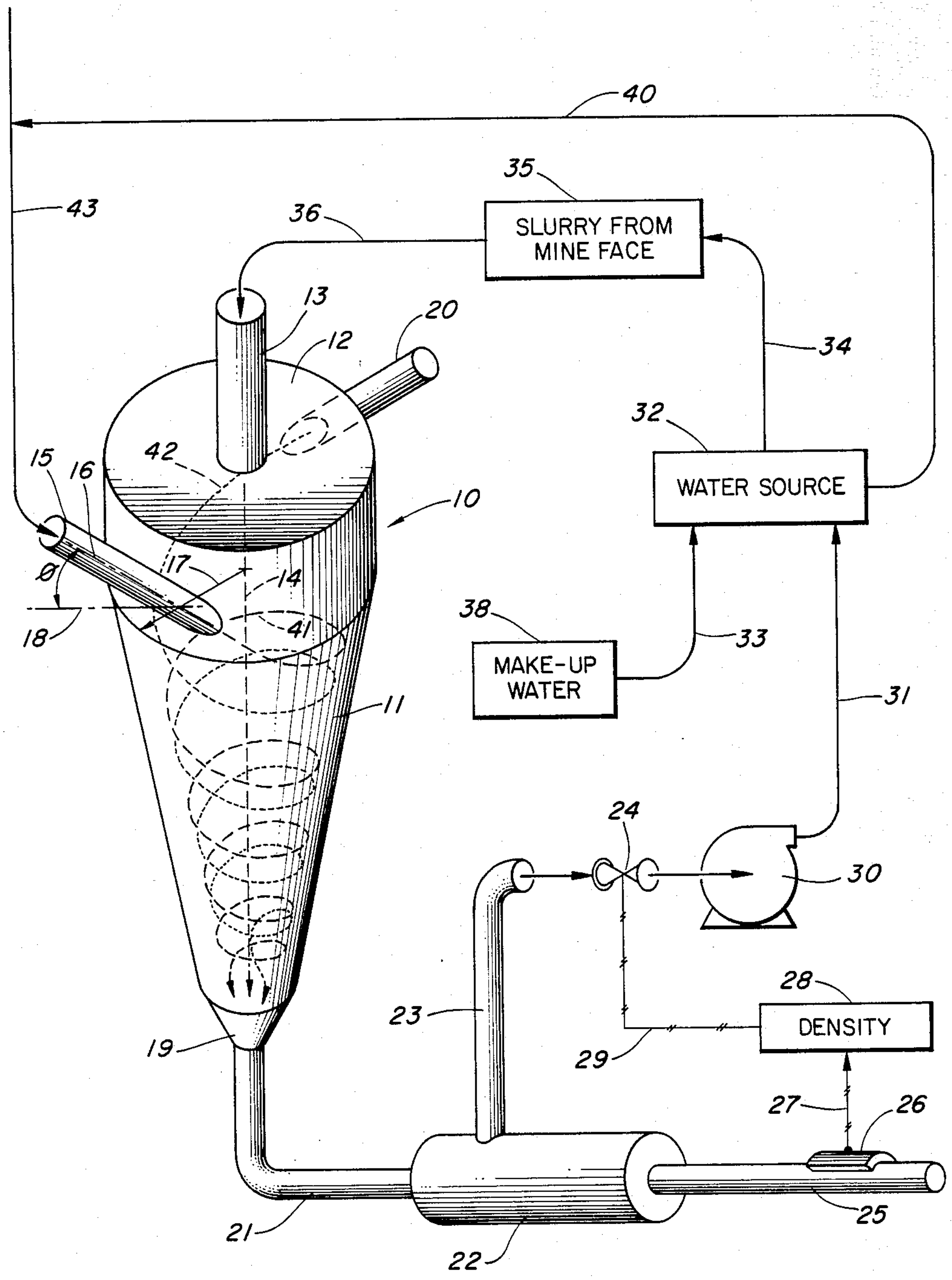
SLURRY FROM MINE FACE
WATER SOURCE
MAKE-UP WATER
DENSITY
10
11
12
13
14
15
16
17
18
19
20
21
22
23
24
25
26
27
28
29
30
31
32
33
34
35
36
38
40
41
42
43
Ø

MULTIPOINT SLURRY INJECTION JUNCTION

BRIEF DESCRIPTION OF THE PRIOR ART

A structure which resembles the apparatus of this invention is illustrated in U.S. Pat. No. 445,390 to Cosgrove. In this patent, however, the device has a tangential inlet and a tangential outlet. The axial opening in the base of the cone is an outlet for gases. The apparatus also contains all kinds of baffles, dampers, and the like to control burning. The patent basically relates to a separator, rather than a combining apparatus.

U.S. Pat. No. 2,252,581 to E. C. Saint-Jacques also discloses a cyclone separator which has tangential inlets with axial outlets. It does not describe an apparatus to combine several fluid streams of different pressures.

BRIEF DESCRIPTION OF THE INVENTION

This invention describes a combining apparatus for unifying several fluid streams of different pressures, flow rates, and compositions into a single stream. It essentially comprises a conically configured chamber with a low pressure inlet at the base of the cone. The low pressure inlet is preferably axially aligned with the chamber axis. A high pressure inlet is tangentially attached near the base and at an angle to the first inlet. The angle directs the flow of liquid generally in the direction of the outlet which is located at the apex of the conically-shaped chamber.

The vortex formed by the high pressure fluid causes a low pressure fluid region for the low pressure inlet. The conical shape combines the fluid to a single stream at the outlet. A dewatering apparatus may be incorporated to control concentration of several slurry streams at the high or low pressure inlets.

BRIEF DESCRIPTION OF THE FIGURE

The FIGURE illustrates a combining apparatus with associated connections for use of the apparatus in a slurry transportation system.

DETAILED DESCRIPTION OF THE INVENTION

Referring to the drawing, an enclosure 10 has generally conical sidewalls 11 and an enclosed base 12. The enclosure is hollow and can be fabricated from any suitable material such as steel. A first inlet 13 is attached through the base 12 of the conical structure and is generally aligned with the axis 14 of the conical enclosure 10. A second inlet pipe 15 is attached so that its axis 16 lies on a tangent to a diameter 17 of enclosure 10. The inlet 15 also is positioned at an acute angle $\phi$ with a line 18 which would lie in a plane through diameter 17 and normal to axis 14. In the preferred embodiment, this angle is 45°, however, any angle can be used so long as the direction of discharge is toward combining outlet 19 at the apex of conical enclosure 10.

A third inlet 20 could be mounted in the same manner as inlet 15; however, when an additional inlet is added, flow from each inlet must be the same in order to maintain the vortex for low pressure inlet 13.

The discharge or combining outlet 19 is coupled through a pipe 21 to the inlet of a decanting or dewatering apparatus 22. A dewatering outlet 23 is connected to a controllable valve 24 which is either a proportional valve or an open-close valve depending on desired operation. The output from dewatering apparatus 22 is coupled through a pipe to a pipeline 25 where the combined material inside pipe 25 is transported to a remote location. The dewatering apparatus is well known in the art and is fully described in U.S. Pat. No. 3,400,984 issued to K. R. Shellene et al and titled "System for Pumping Slurries of High Concentrations".

A density gauge 26 is installed on pipeline 25. The gauge can be of the nuclear type and has its output coupled through a wire 27 to a density determining system 28 which output is coupled through wire 29 to controllable valve 24. A pump 30 removes the water from dewatering apparatus 22 through pipe 23 and valve 24 and discharges it through pipe 31 to a water source 32 which may, for example, be in in-mine sump. Make-up water source 38 may be supplied through pipe 33 to water source 32. When the system is used as a mine coal transportation system, water to the mine face is supplied from sump 32 by a pump (not shown) through a pipe 34 to the face equipment (not shown) where a slurry is formed with the mined coal at 35 and transported with a pipe 36 to inlet 13, for example.

Water can be moved by a pump (not shown) to a pipe 40 to inlet 15, to keep up the total flow rate required if this apparatus is used as the first slurry junction in the mine. At any other location the main slurry line 43 will be fed into the pipe 15.

OPERATION

The drawing illustrates one use of the apparatus. It is obvious that the invention lies, not necessarily in the particular use illustrated but, in the actual combining apparatus 10 and its mode of operation.

Referring first to the combining apparatus, its operation is first described. The chamber 10 with its generally conical sidewalls 11 causes a general merging of various inlet streams in the following manner. Fluids entering inlet 15 from main slurry line 43 or water source 32 enter at a tangent into enclosure 10. As the fluids enter it takes the path 41 around the sidewall 11 forming a low pressure vortex along axis 14. The low pressure vortex will permit the pumping of low pressure fluids into inlet 13 since it is along the vortex.

Not only does the vortex assist in mixing the various streams but also the sudden enlargement from a small inlet 13 to a large enclosure 10 assists in the mixing process. If both inlets 15 and 20 are required, they should be attached so that the fluids rotate in the same direction as, for example, the counter clockwise rotation of 41 and 42 from inlets 15 and 20, respectively. They must also have the same flow rates in order to maintain the vortex. Another important criterion regarding the fluids entering the inlets is that the pressure of the fluid entering inlet 15 or 20 must be higher than the pressure entering inlet 13.

In one use of the apparatus disclosed, a mine face 35 is supplied from a water source 32. A coal is mined it is mixed with water and pumped through pipe 36 to inlet 13. Additional water can be supplied from water source 32 through pipe 40 to inlet 15 if the apparatus is at the first slurry face; but, if used at any other location, the main slurry line 43 will be fed into pipe 15. As the water or slurry moves in the direction of arrows 41 and 42, a low pressure vortex is formed along inlet 13 permitting low pressure fluid to enter inlet 13. All fluids and slurries, regardless of variations in pressure or concentration, will be combined at outlet 19 and transferred to dewatering apparatus 22.

Since it costs nearly the same to transport water as it does a 50 percent coal-water slurry, for example, it is more economical to remove the excess water and increase the concentration. The apparatus 22 will remove the water by a controlled amount as determined by density measuring systems 26 and 28 which signal its response to valve 24.

CONCLUSION

A novel apparatus has been disclosed that will permit the combination of two or more pipeline streams to a single outlet for pipelining to a remote location. The combination apparatus will accept variation in concentration, pressure, and velocities so long as the pressure at the tangential inlets exceed the pressure at the axial inlet.

It is obvious that changes can be made in the application and still be within the spirit and scope of the invention as disclosed in the specification and appended claims.

What is claimed is:

1. A new use for an apparatus comprising:

(a) a chamber having a side wall, a substantial portion of which is conical, a top at its base, and a longitudinal axis;

(b) a first inlet means mounted through said top and aligned with said axis;

(c) a second inlet means mounted tangentially through said side wall and having an axis, the axis of said second inlet means forming an acute angle with a plane extending normal to the axis of said chamber;

(d) outlet means at the apex of said chamber and aligned with the axis of said chamber, said new use comprising a method of mixing the contents from at least a pair of pipelines;

said new use comprising:

(e) injecting a first fluid at a first pressure into said first inlet means;

(f) injecting a second fluid at a second pressure into said second inlet means; and (g) removing said first and second fluids at said outlet means at said apex whereby said first and second fluids at different pressures are mixed together.

2. Method as described in claim 1 wherein said second pressure is higher than said first pressure.

3. Method as described in claim 1 or 2 including the step of dewatering said removed fluid.

* * * * *